(No Model.)  7 Sheets—Sheet 1.

E. H. BISSETT.
NAIL CUTTING MACHINE.

No. 457,416. Patented Aug. 11, 1891.

Witnesses:
John Grist
Aft Storey

Inventor
Edwin H. Bissett
By Henry Grist
Attorney (No Model.)
7 Sheets—Sheet 2.

E. H. BISSETT.
NAIL CUTTING MACHINE.

No. 457,416. Patented Aug. 11, 1891.

(No Model.)

E. H. BISSETT.
NAIL CUTTING MACHINE.

No. 457,416. Patented Aug. 11, 1891.

Witnesses:
John Grist
A. H. Dorsey

Inventor
Edwin H. Bissett
By Henry Grist
Attorney.

(No Model.) 7 Sheets—Sheet 4.

E. H. BISSETT.
NAIL CUTTING MACHINE.

No. 457,416. Patented Aug. 11, 1891.

Witnesses:
John Grist,
D. A. Horsey

Inventor:
Edwin H. Bissett
By Henry Grist
Attorney.

(No Model.)  7 Sheets—Sheet 5.

E. H. BISSETT.
NAIL CUTTING MACHINE.

No. 457,416.  Patented Aug. 11, 1891.

Witnesses:
John Grist
D. H. Horsey

Inventor:
Edwin H. Bissett
By Henry Grist
Attorney.

(No Model.)   7 Sheets—Sheet 6.

E. H. BISSETT.
NAIL CUTTING MACHINE.

No. 457,416.   Patented Aug. 11, 1891.

(No Model.) 7 Sheets—Sheet 7.
E. H. BISSETT.
NAIL CUTTING MACHINE.
No. 457,416. Patented Aug. 11, 1891.
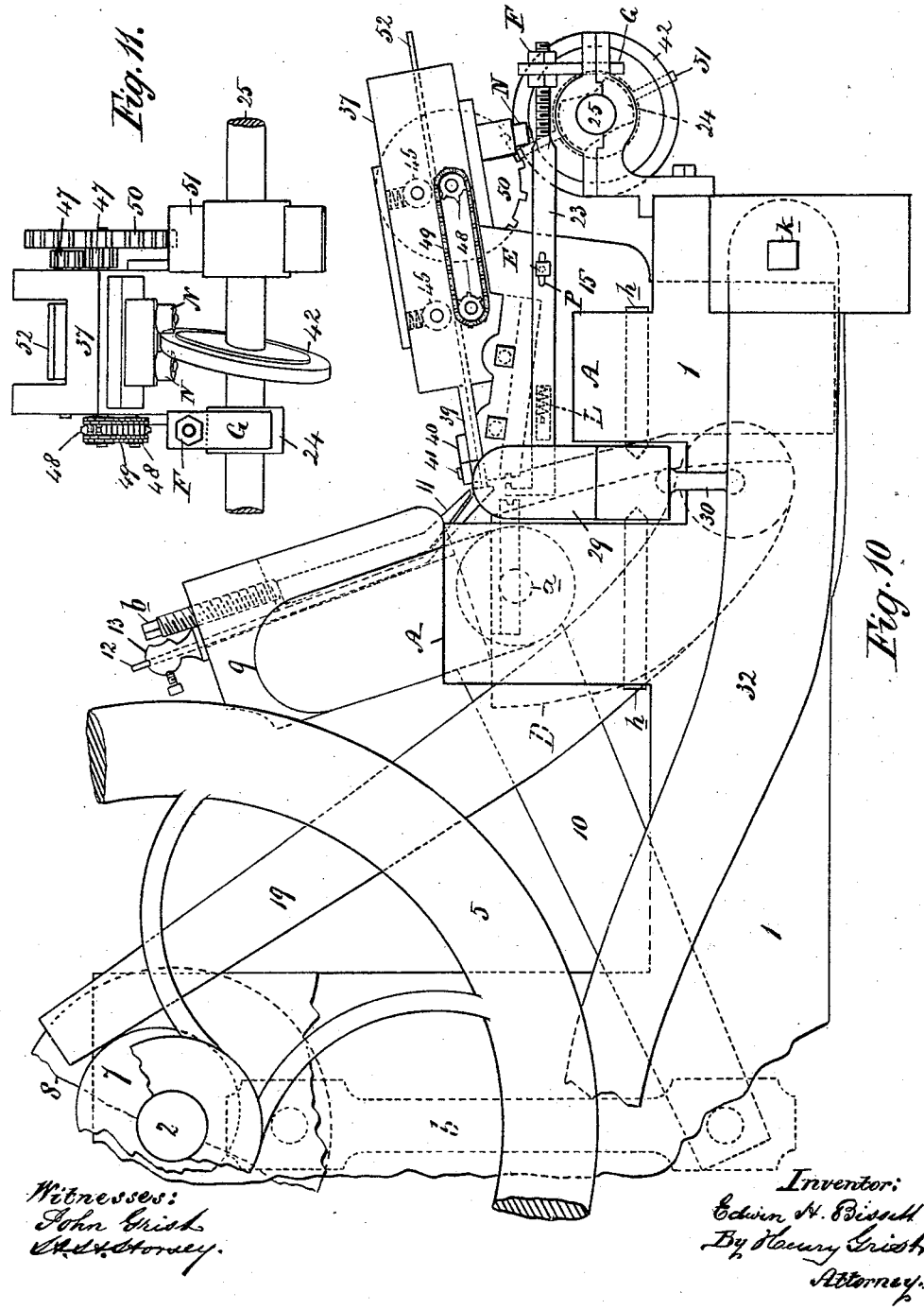

UNITED STATES PATENT OFFICE.

EDWIN H. BISSETT, OF MONTREAL, CANADA, ASSIGNOR TO DONALD ALEXANDER SMITH, OF SAME PLACE.

NAIL-CUTTING MACHINE.

SPECIFICATION forming part of Letters Patent No. 457,416, dated August 11, 1891.

Application filed June 6, 1890. Serial No. 354,479. (No model.)

*To all whom it may concern:*

Be it known that I, EDWIN H. BISSETT, of Montreal, in the Province of Quebec, in the Dominion of Canada, have invented certain new and useful Improvements in Nail-Cutting Machines; and I do hereby declare that the following is a full, clear, and exact description of the same, reference being had to the accompanying drawings, in which—

Figure 1:
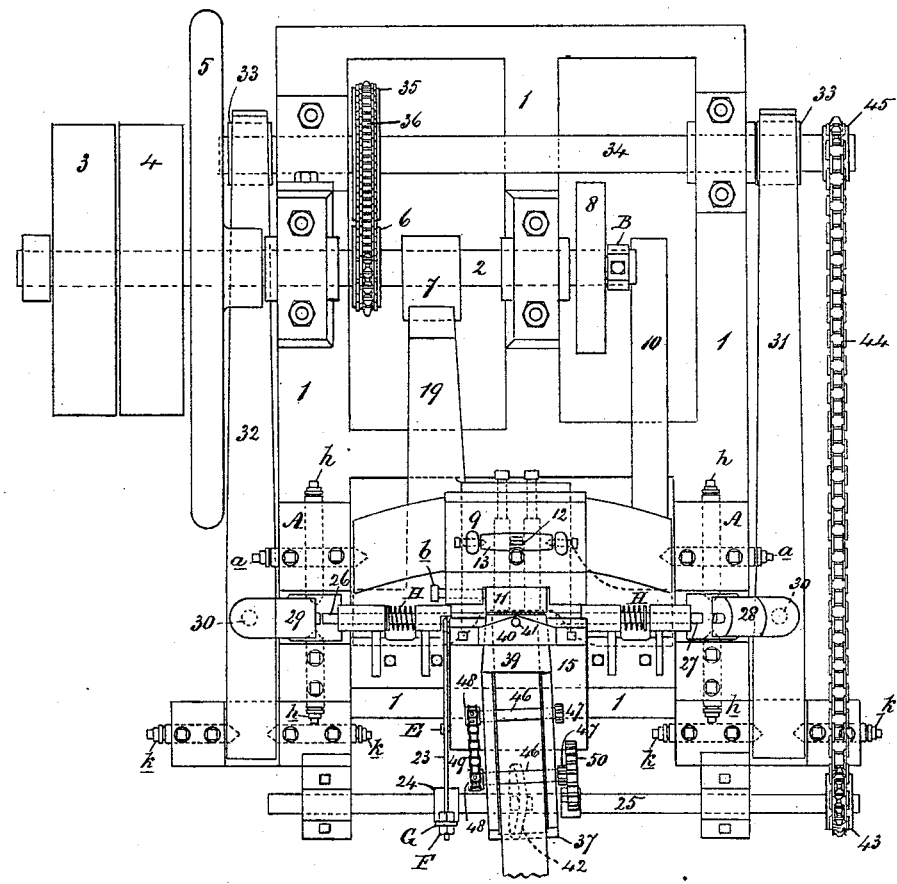
Figure 2:
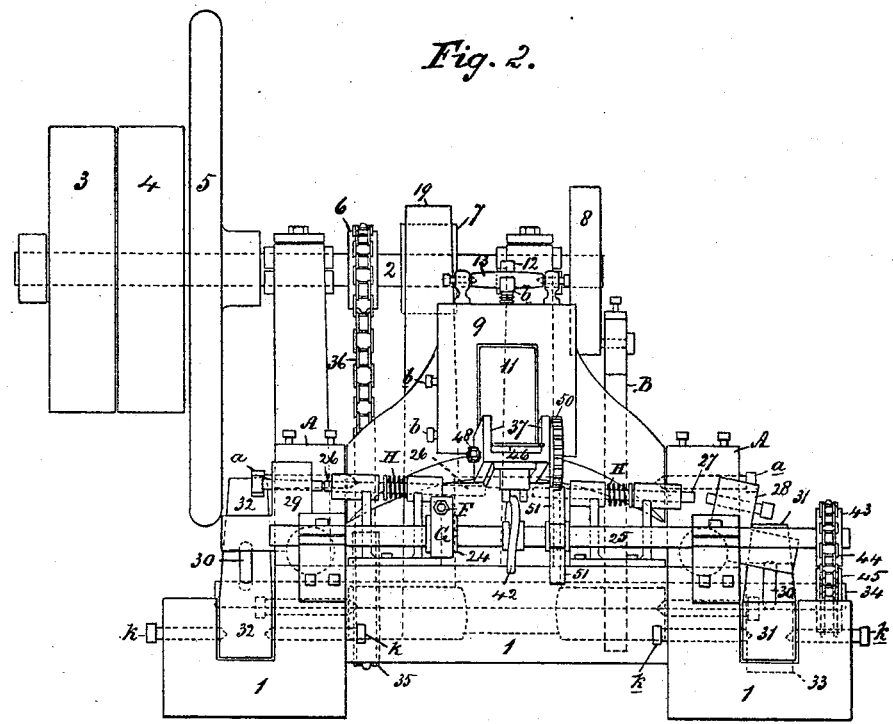
Figure 3:
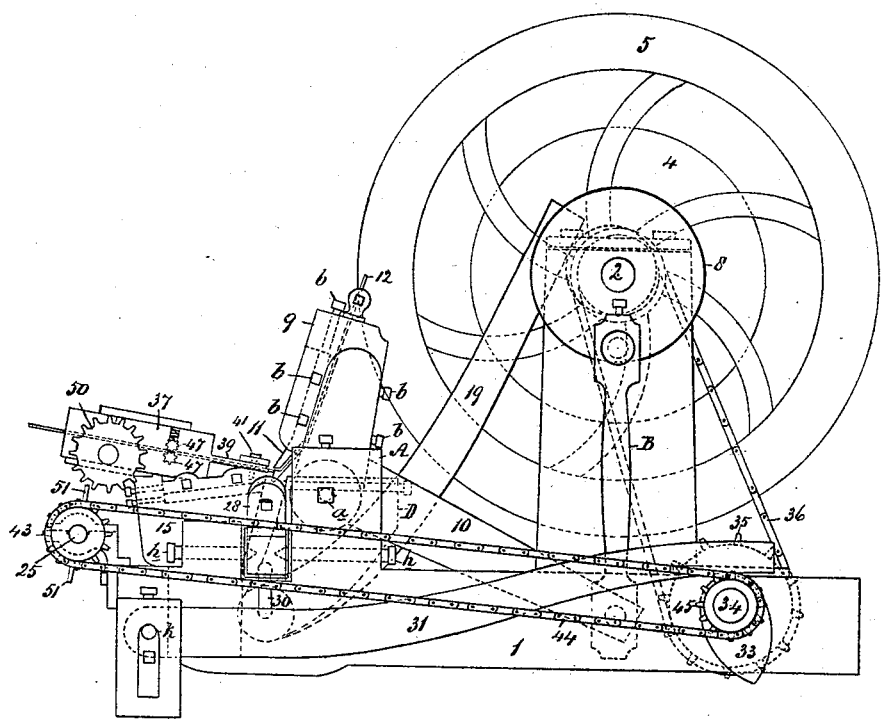
Figure 4:
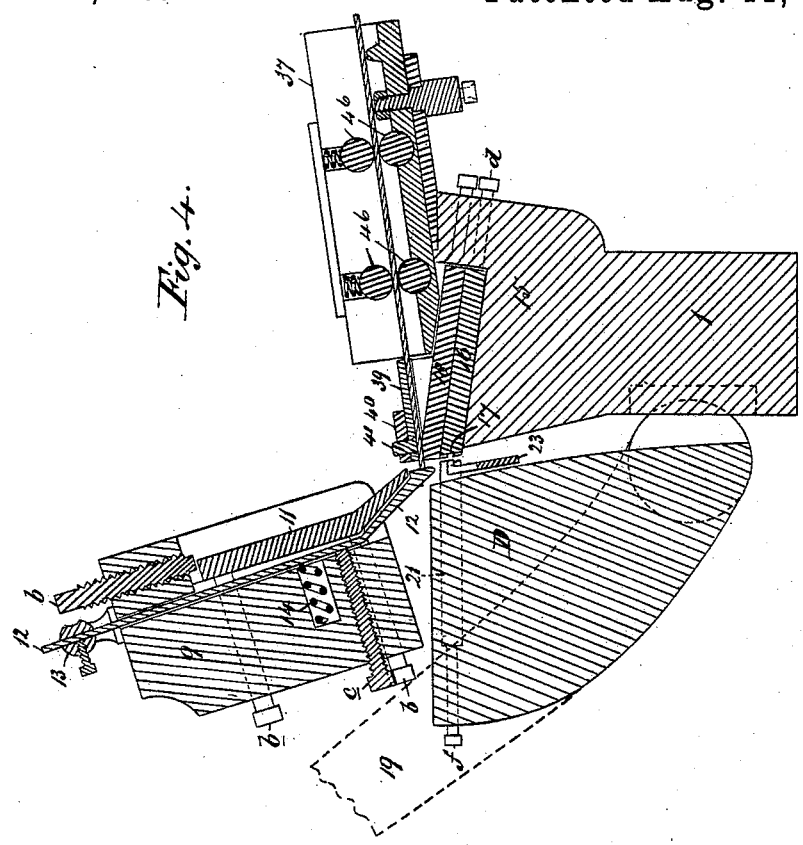
Figure 5:
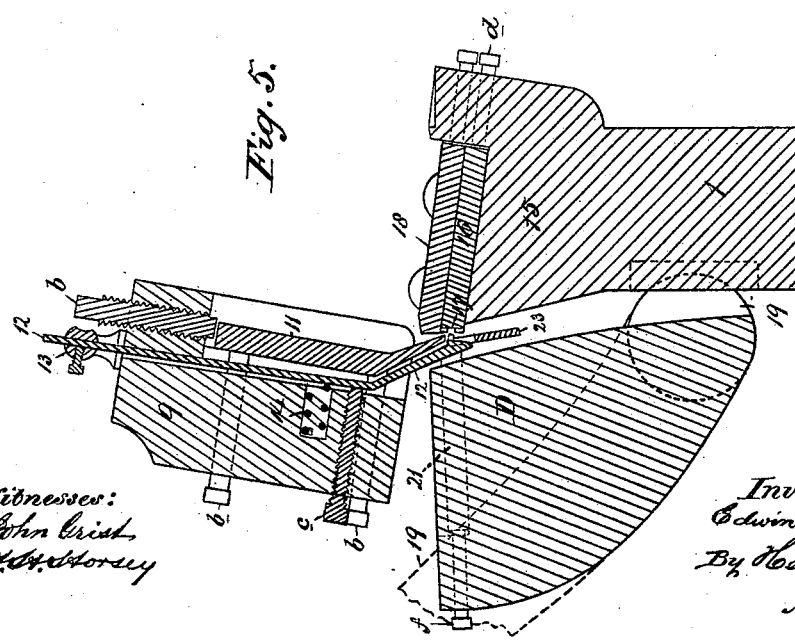
Figure 6:
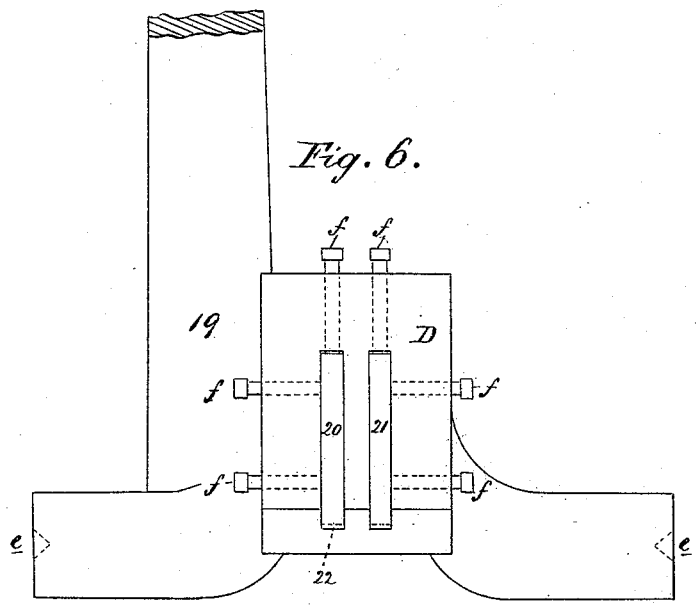
Figure 7:
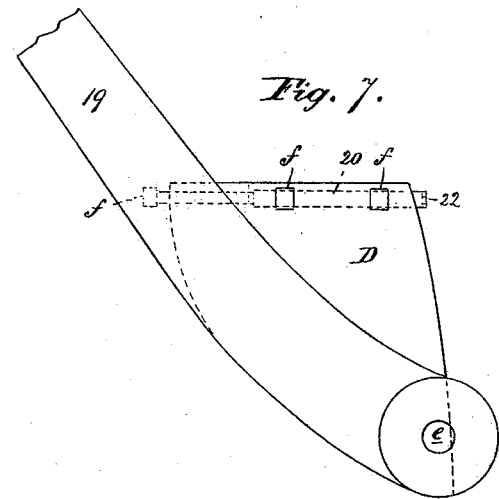
Figure 8:
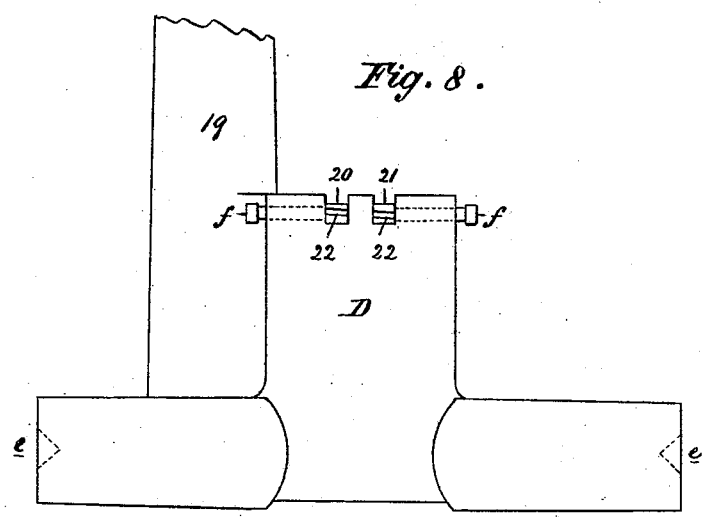
Figure 9:
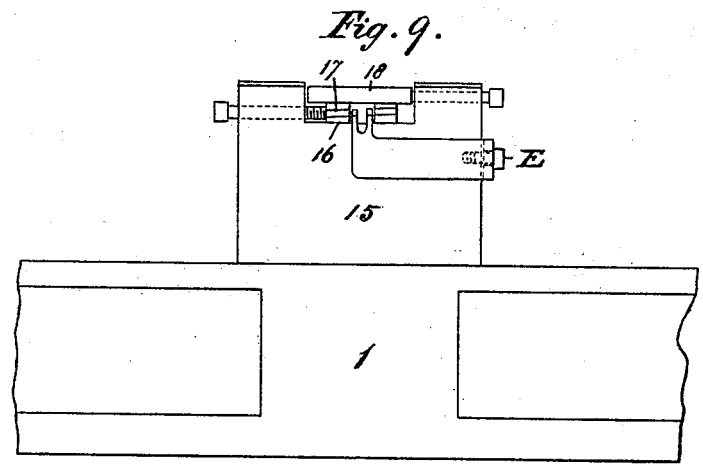

Figure 1 is a top view or plan of my improved machine. Fig. 2 is a front elevation of the same. Fig. 3 is a side view from the right of Fig. 1. Fig. 4 is an enlarged vertical section through the knife-head, holding-lever, anvil-block, and feed-carriage, showing the knife in the raised position to descend and cut the nail-plate. Fig. 5 is a similar view minus the feed-carriage and showing the knife in the descended position after cutting the nail. Fig. 6 is a top view of the holding-lever detached and enlarged, showing the grooved die or dies. Fig. 7 is a side view of the same. Fig. 8 is a front view of the same. Fig. 9 is a front view of the anvil-block or bed of the machine enlarged, showing the grooved die or dies, the knife bed or plate above the die or dies, and the gripping-bar for holding the nail in the grooves of the die or dies while being headed. Fig. 10 is a side elevation of a portion of the machine enlarged, and Fig. 11 is a front elevation of a portion of the same, showing the feed and oscillating gears of the carriage.

My invention relates to improvements for oscillating the feed-carriage and gear for said carriage to feed the nail-plate to the knife, and also improvements for operating the heading-dies and the knife-block.

My invention consists in the combination and construction of certain parts hereinafter described, and specifically pointed out in the claims.

1 is the main frame or bed of the machine.

2 is the main driving-shaft journaled in bearings cast with the bed, said shaft carrying fast and loose pulleys 3 4, fly-wheel 5, sprocket-wheel 6, cam or eccentric 7, and at the end a disk 8.

A A are bearings cast integral with the bed 1, and between them is pivoted on centers *a a* the knife-head 9, which has an arm 10 extending rearwardly and connected to disk 8 by a pitman B, so that by rotation of the driving-shaft the disk will lift and depress one end of the arm and rock the knife-head on its centering-screws *a a*, and thereby give to the knife a chopping motion to cut the nail-plate, as is now done in other machines.

The knife 11 is adjustably secured to the knife-head 9 by set-screws *b*, and behind the knife the knife-block is provided with a gage-rod 12, which is hung to a cross-head 13, and is set to an adjusted position by a screw *c* to gage the breadth of the nail to be cut.

14 is a spring in a recess in the knife-head to force the gage-rod against the back of the knife until the nail-plate overcomes the resistance and forces back the gage-rod, the set-screw *c* then offering resistance to the nail-plate while the nail is being cut off by the descending knife. During the descent of the knife the lower end of the gage-rod forces the nail against the face of the bed-knife, thus holding the nail from falling until the descending knife at the extremity of its stroke carries the nail into the groove in the dies of the anvil-block.

The anvil-block 15 is integral with bed 1 and is located below the knife-head, and in a recess in the top of the anvil-block rests a die or dies 16, having a groove 17, parallel to the inclination or shear of the knife-edge, and said groove receives the nail after being cut, the nail then having an inclination corresponding to the groove. The die-plate or dies 16 are held removably by set-screws *d* to allow the dies to be adjusted.

18 is the bed knife or plate on which the nail-plate rests while being cut.

19 is an inverted-T-shaped holding-lever, the shorter arms or trunnions pivoted between an open portion of bed 1, the longer arm extending upwardly and rearwardly and bearing on a cam or eccentric 7, so that by rotation of shaft 2 the lever will rock on its pivot-centers *e* to throw forward a head D on the lever to meet the nail as soon as the cutting-head has moved up sufficiently to allow the head or lever 19 to come forward. The nipper-bar moves up and holds the nail as soon as it has reached the grooves of the dies, retaining its hold only until the cutting-head has moved away and the dies in head D of lever 19 have gripped the nail.

The lever 19 is provided with a die or dies 20 21, adjustable by set-screws $ff$ and having a diagonal groove 22, facing the back of the knife and corresponding in inclination to groove 17 in the opposite die-plate or dies 16 of the anvil-block.

23 is a nipper-bar attached by bolt E to the anvil-block to reciprocate at the side thereof, the bolt passing through the slot P, Fig. 10, in the bar. The inner end of the nipper-bar is turned inward and upward and bifurcated in front of the die, the fork being formed so that the end of the gage-rod may move down between the two prongs as it descends with the nail, each fork gripping the nails, which are cut with the portion of the blank intended for the head of the nail nearest to said fork. The opposite end of the nipper-bar is provided with a nut F, screwing thereon, having a downwardly-secured arm G, which has frictional contact with a cam-wheel 24 on shaft 25, journaled in brackets secured to bed 1 to reciprocate the bar and cause the forks of the bent end to grip the nail in the die until the head D of the holding-lever 19 moves up and the nail is gripped in the diagonal groove 17 of the die or dies 16 on the one side and the diagonal groove 22 of dies 20 and 21 on the other side. When the head D of lever 19 has moved the extreme distance toward the knife, the nail is ready for the blow of the heading-punch, and the reaction of the nipper-bar 23 is effected by a spring L, Fig. 10, at the back of the bar in a recess in the anvil-block.

26 27 are respectively heading-dies on opposite sides of the anvil-block, and they are supported in bearings attached by screws to bed 1, and they are severally reacted by a coiled spring H. A forward movement to head the nail is given to the heading-dies by blocks 28 29 alternately, said blocks pivoted on centers $h$ to rock between the bearings A A, previously referred to, and said blocks 28 29 are supported loosely on the end of a link 30, and the other end of the link bears, respectively, on levers 31 32, pivoted near one end between portions of bed 1 by screws $k$, and the other end of said levers bears on a cam or eccentric 33, carried by shaft 34, and said shaft is driven by sprocket-wheel 35, chain 36, and sprocket-wheel 6 on main shaft 2, so that when said shaft is rotated the cam or eccentric thereon will lift the upper end of the long arm of the lever, and the lever will lift link 30 to rock the blocks 28 29 alternately and force the dies to head the nail.

37 is the feed-carriage provided with a covering 39 at top, under which the nail-plate feeds, as through a flat nozzle.

40 is a flat bail secured to the anvil-block and connected to the feed-carriage by a pivot 41, passing through covering 39.

The under side of the feed-carriage is provided with parallel anti-friction rollers N N, between which rotates a wabble-wheel 42 on shaft 25, and said shaft is driven by sprocket-wheel 43, chain 44, and sprocket-wheel 45 on shaft 34. By rotation of the wabble-wheel the feed-carriage is oscillated horizontally to present the nail-plate to the knife at the required angle to cut the nails, heads and points alternating, without overturning the nail-plate.

The feed-carriage 37 is provided with two pairs of feed-rollers 46, each pair geared together by cog-wheels 47 at one side of the carriage, and a roller of each pair at the opposite side of the carriage is provided with a sprocket-wheel 48, connected by a drive-chain 49 for rotating the rollers, and one of said rollers carries a sprocket-wheel 50, which is intermittently impelled by a two-arm wiper 51 on shaft 25, striking against the sprockets successively and timed so that the nail-plate 52 shall be advanced to the gage-rod when the knife is rising and remain stationary during the cutting of the knife.

I claim as my invention—

1. The combination, with the nipper-bar 23, provided with an arm G, of the shaft 25, journaled to the front of the main frame 1, and carrying a cam-wheel 24, and the reacting spring L to reciprocate said nipper-bar, as set forth.

2. The combination of the feed-carriage 37, having geared feed-rollers 46, provided with sprocket-wheels 48, and the shaft 25, journaled to the front of the main frame 1 and carrying a two-arm wiper 51 to intermittently feed the nail-plate 52 to the knife, as set forth.

3. The combination of the feed-carriage 37, provided underneath with anti-friction rollers N, and the shaft 25, journaled to the front of the main frame 1 and carrying a wabble-wheel 42, rotating between said rollers to oscillate the feed-carriage, as set forth.

4. The combination of the supplementary shaft 34, geared to the main driving-shaft 2, said shaft 34 carrying cams 33, the side levers 31 32, resting near one end on one of said cams and pivoted near the opposite end to the main frame 1, the links 30, respectively bearing endwise on said levers, and the heading-blocks 28 29, pivoted to the main frame and tilting by the movement of said levers to operate the heading-dies 26 27 alternately, as set forth.

5. The combination of the feed-carriage 37, pivoted near the inner end to the anvil-block 15 and having two pairs of geared rollers 46, one roller provided with a sprocket-wheel 50 to operate the feed-gear, and the shaft 25, journaled to the main frame 1 in front, said shaft carrying a wabble-wheel 42 and wiper 51 for oscillating the feed-carriage and driving the feed-gear, as set forth.

EDWIN H. BISSETT.

Witnesses:
THOMAS T. TURNBULL,
C. DOWLING.